(12) United States Patent
Naamad

(10) Patent No.: US 9,459,799 B1
(45) Date of Patent: Oct. 4, 2016

(54) IDENTIFYING PROBLEMATIC APPLICATION WORKLOADS BASED ON ASSOCIATED RESPONSE TIMES

(71) Applicant: EMC Corporation, Hopkinton, MA (US)

(72) Inventor: Amnon Naamad, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 20 days.

(21) Appl. No.: 14/314,523

(22) Filed: Jun. 25, 2014

(51) Int. Cl.
*G06F 3/00* (2006.01)
*G06F 3/06* (2006.01)

(52) U.S. Cl.
CPC ............ *G06F 3/0613* (2013.01); *G06F 3/067* (2013.01); *G06F 3/0659* (2013.01); *G06F 3/0601* (2013.01); *G06F 3/061* (2013.01)

(58) Field of Classification Search
None
See application file for complete search history.

(56) References Cited

U.S. PATENT DOCUMENTS

| | | | | |
|---|---|---|---|---|
| 8,706,701 | B1* | 4/2014 | Stefanov | G06F 7/00 707/687 |
| 8,782,795 | B1* | 7/2014 | Field | H04L 63/205 726/25 |
| 2011/0246419 | A1* | 10/2011 | Yancey | G06F 17/30557 707/624 |
| 2011/0258630 | A1* | 10/2011 | Fee | G06F 9/4843 718/101 |
| 2012/0030502 | A1* | 2/2012 | Rueegg | G06F 11/0709 714/4.1 |
| 2012/0226803 | A1* | 9/2012 | Bharadwaj | H04L 41/0253 709/224 |
| 2013/0185729 | A1* | 7/2013 | Vasic | G06F 9/5072 718/104 |
| 2013/0262685 | A1* | 10/2013 | Shelton | G06F 1/206 709/226 |
| 2014/0122706 | A1* | 5/2014 | Boerner | H04L 41/12 709/224 |

* cited by examiner

*Primary Examiner* — Henry Tsai
*Assistant Examiner* — Aurangzeb Hassan
(74) *Attorney, Agent, or Firm* — Muirhead and Saturnelli, LLC

(57) ABSTRACT

Described are techniques that identify problematic workloads. Measured response times for workloads associated applications are received. Each of the applications has one of the workloads resulting in one of the measured response times for the application. The applications share a set of one or more resources. In accordance with a first set of one or more criteria, it is determined whether there is an occurrence of abnormal performance with respect to performance of the applications. Responsive to determining the occurrence of abnormal performance with respect to performance of the applications, second processing is performed that includes determining, using the measured response times and in accordance with a second set of one or more criteria, an application set of one or more of the applications having an associated workload causing the occurrence of abnormal performance. A remediation may also be taken to address or alleviate the abnormal performance.

18 Claims, 10 Drawing Sheets

IDENTIFYING PROBLEMATIC APPLICATION WORKLOADS BASED ON ASSOCIATED RESPONSE TIMES

BACKGROUND

1. Technical Field

This application generally relates to data storage systems, and more particularly to techniques related to service level objectives (SLOs), such as identifying actual and/or potential SLO violations, and system performance, such as identifying a cause of a performance issue.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

SUMMARY OF THE INVENTION

In accordance with one aspect of the invention a method of identifying problematic workloads comprising: receiving a plurality of measured response times for a plurality of workloads associated with a plurality of applications, each of the plurality of applications having one of the plurality of workloads resulting in one of the plurality of measured response times for said each application, wherein the plurality of applications share a set of one or more resources; determining, in accordance with a first set of one or more criteria, whether there is an occurrence of abnormal performance with respect to performance of the plurality of applications; and responsive to determining the occurrence of abnormal performance with respect to performance of the plurality of applications, performing second processing, said second processing including: determining, using the plurality of measured response times and in accordance with a second set of one or more criteria, an application set of one or more of the plurality of applications each having an associated one of the plurality of workloads causing the occurrence of abnormal performance. Each of the plurality of workloads may be an I/O workload with respect to an associated one of the plurality of applications issuing I/O operations of the I/O workload. The one or more resources may include any of one or more physical storage devices, one or more disk adapters, and one or more processors. The first set of one or more criteria may include determining that there is an occurrence of abnormal performance if any one or more of a service level objective violation and a risk of a service level objective violation are detected. The service level objective violation for one of the plurality of applications and the risk of a service level objective violation for the one application may each be determined with respect to a defined service level objective for the one application. The defined service level objective may specify a defined response time and it may be determined that the service level objective violation occurs when a measured response time for an associated workload of the one application exceeds the defined response time, and it may be determined that the risk of the service level objective occurs for the one application when a measured response time for the associated workload of the one application exceeds a modeled expected response time for the associated workload of the one application. The modeled expected response time may be obtained from a modeled performance curve. The second set of one or more criteria may include a rule that determines one of the plurality of applications is included in the application set and is causing the occurrence of abnormal performance if the one application has a first of the plurality of workloads resulting in a first of the plurality of measured response times and the first measured response time is a maximum of all of the plurality of measured response times. The second set of one or more criteria may include a rule that determines whether the difference between the worst of the plurality of measured response times and the best of the plurality of response times is less than 20% of the best measured response time, and if so, then all of the plurality of applications are included in the application set. The second rule may further indicate that, if the difference between the worst measured response time and the best response time is not less than 20% of the best measured response time, then any of the plurality of applications having an associated one of the plurality of measured response times larger than 120% of the best measured response time is included in the application set. The second set of one or more criteria may include a rule that determines whether the difference between the worst of the plurality of measured response times and the best of the plurality of response times is less than 20% of the worst measured response time, and if so, then all of the plurality of applications are included in the application set. The second rule may further indicate that, if the difference between the worst measured response time and the best response time is not less than 20% of the worst measured response time, then any of the plurality of applications having an associated one of the plurality of measured response times larger than 120% of worst best measured response time is included in the application set. A first of the plurality of applications included in the application set may have an associated first of the plurality of workloads wherein the associated first workload has a bursty interarrival time distribution. The application set may include a first of the plurality of applications having an associated first of the plurality of workloads and wherein the second processing may include performing a first remediation action for the first application. The plurality of applications may each issue I/O operations to one or more logical devices having physical storage provisioned on one or more physical devices of a first data storage system for which the occurrence of abnormal performance has been determined, the one or more physical devices may be included in the set of one or more resources shared by the plurality of applications, and wherein the remediation action may include any of a first action notifying a user regarding the first application, the associated first workload, and one or more logical devices to which the first workload is directed as being problematic, a second action of providing a set of dedicated one or more resources of the first data storage system to the first application, a third action of relocating the one or more logical devices and the associated first workload of the first application to another data storage system different from the first data storage system and a fourth action of reducing a number of I/O operations sent in a single burst.

In accordance with another aspect of the invention is a data storage system comprising: one or more processors; one or more physical storage devices wherein storage is provisioned from the one or more physical storage devices for a first set of one or more logical devices; a memory comprising code stored therein that, when executed by a processor, performs a method comprising: receiving a plurality of measured response times for a plurality of workloads associated with a plurality of applications, each of the plurality of applications having one of the plurality of workloads resulting in one of the plurality of measured response times for said each application, wherein the plurality of applications share a set of one or more resources; determining, in accordance with a first set of one or more criteria, whether there is an occurrence of abnormal performance with respect to performance of the plurality of applications; and responsive to determining the occurrence of abnormal performance with respect to performance of the plurality of applications, performing second processing, said second processing including: determining, using the plurality of measured response times and in accordance with a second set of one or more criteria, an application set of one or more of the plurality of applications each having an associated one of the plurality of workloads causing the occurrence of abnormal performance.

In accordance with another aspect of the invention is a non-transitory computer readable medium comprising code stored thereon that, when executed, performs a method of identifying problematic workloads, the method comprising: receiving a plurality of measured response times for a plurality of workloads associated with a plurality of applications, each of the plurality of applications having one of the plurality of workloads resulting in one of the plurality of measured response times for said each application, wherein the plurality of applications share a set of one or more resources; determining, in accordance with a first set of one or more criteria, whether there is an occurrence of abnormal performance with respect to performance of the plurality of applications; and responsive to determining the occurrence of abnormal performance with respect to performance of the plurality of applications, performing second processing, said second processing including: determining, using the plurality of measured response times and in accordance with a second set of one or more criteria, an application set of one or more of the plurality of applications each having an associated one of the plurality of workloads causing the occurrence of abnormal performance. Each of the plurality of workloads may be an I/O workload with respect to an associated one of the plurality of applications issuing I/O operations of the I/O workload. The one or more resources may include any of one or more physical storage devices, one or more disk adapters, and one or more processors. The first set of one or more criteria may include determining that there is an occurrence of abnormal performance if any one or more of a service level objective violation and a risk of a service level objective violation are detected. The service level objective violation for one of the plurality of applications and the risk of a service level objective violation for the one application may each be determined with respect to a defined service level objective for the one application, wherein the defined service level objective may specify a defined response time and it may be determined that the service level objective violation occurs when a measured response time for an associated workload of the one application exceeds the defined response time, and it may be determined that the risk of the service level objective occurs for the one application when a measured response time for the associated workload of the one application exceeds a modeled expected response time for the associated workload of the one application.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
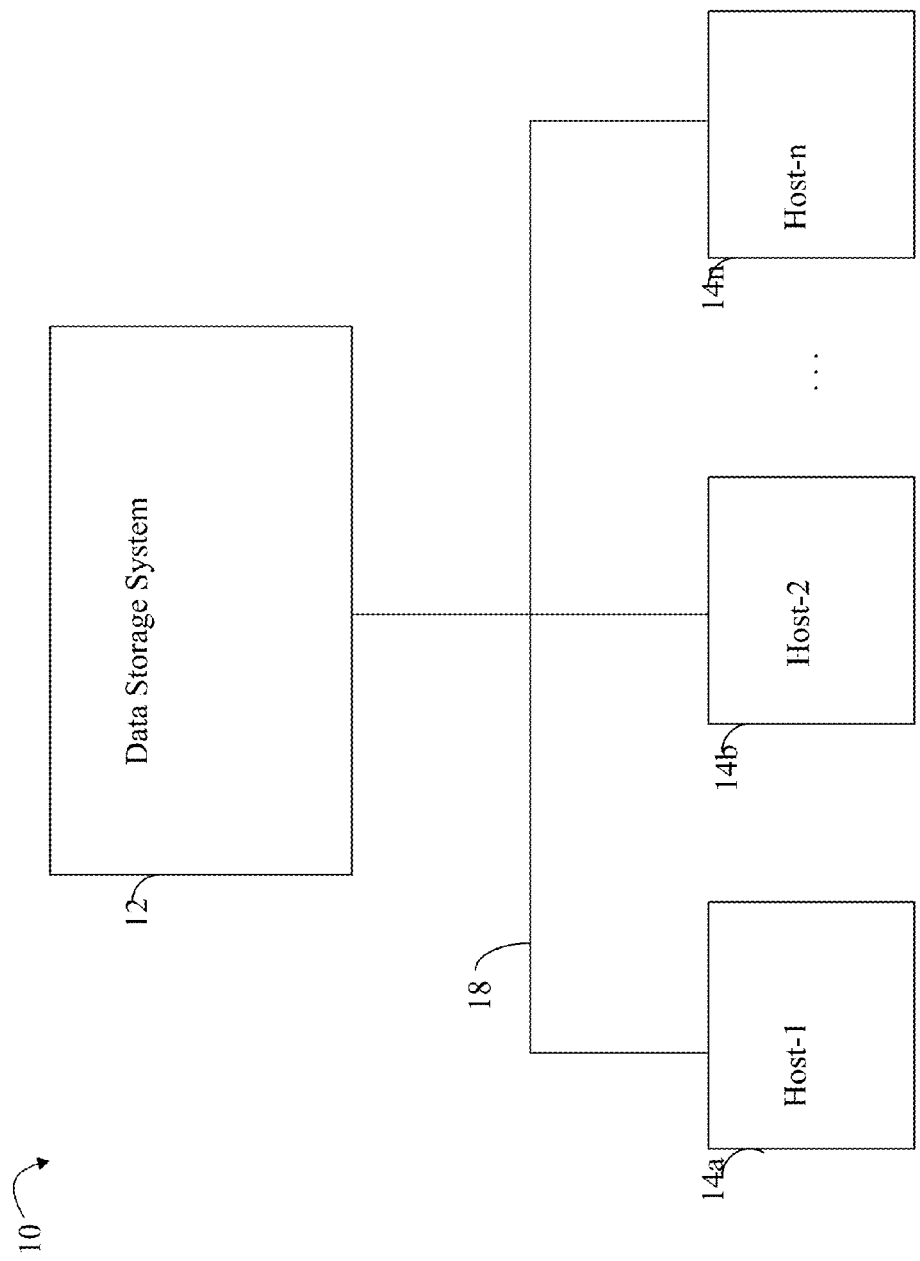
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
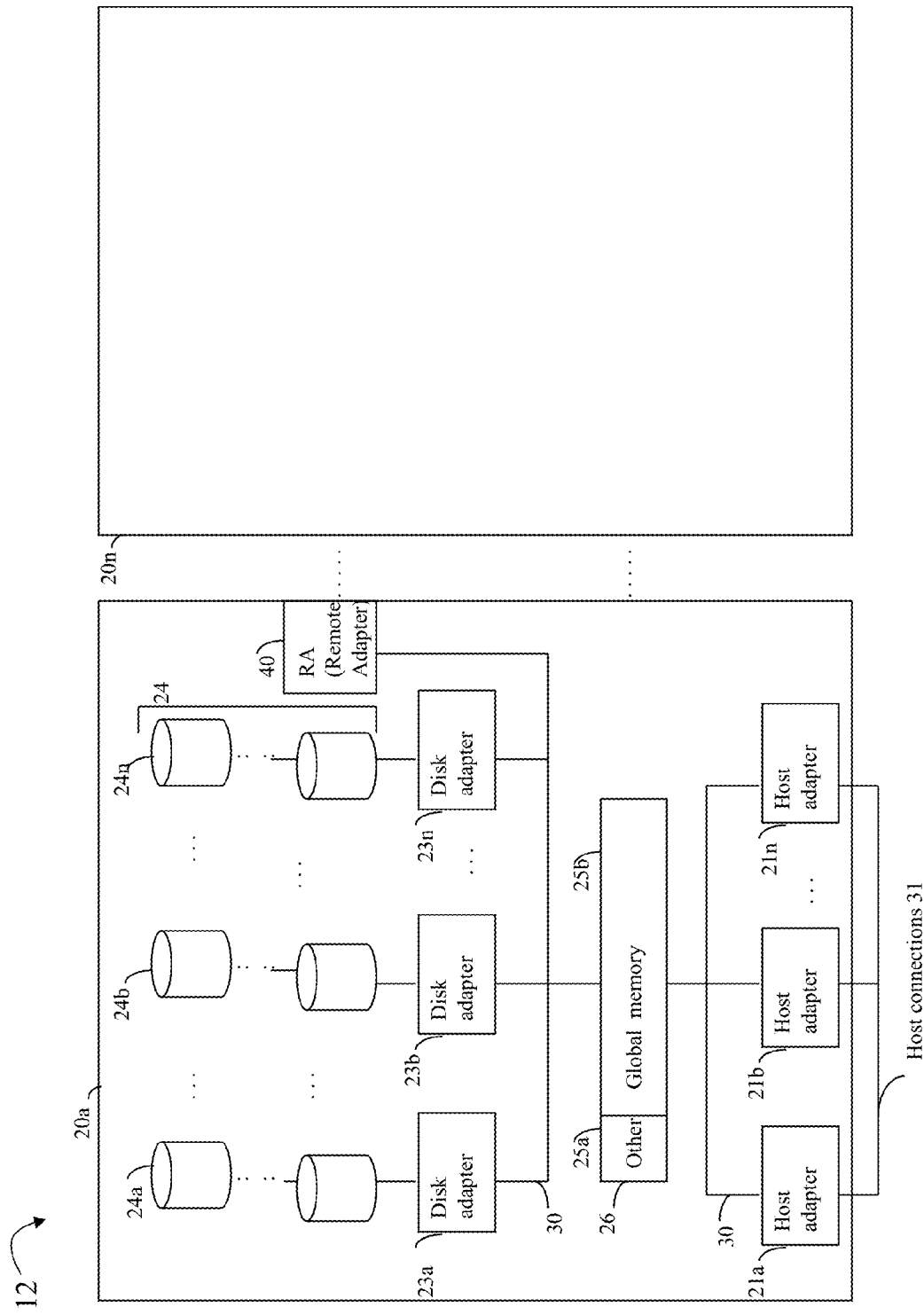
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

Figure 2B:
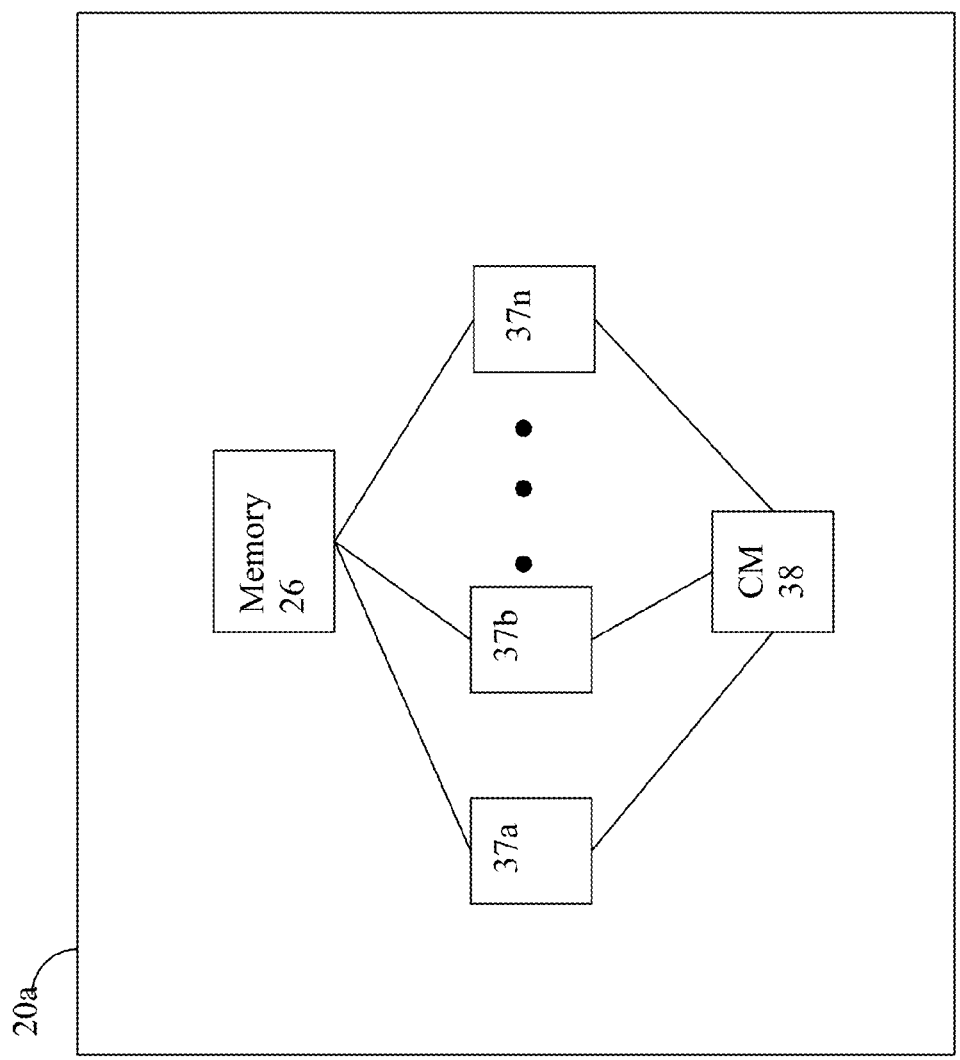
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

The data storage system may provide a multi-tenant (MT) environment whereby multiple tenants store their data on the data storage system. In such an exemplary MT environment, a different service level objective or SLO may be specified for each tenant that defines a guaranteed performance level for the tenant. For example, an SLO may be related to a guaranteed level of performance with respect to I/O operations serviced at the data storage system for the tenant. In this case, the SLO specified for the tenant may be expressed in terms of one or more metrics, such as average response time (RT) with respect to I/Os issued by the tenant. For example, an SLO may specify an average RT of 3 milliseconds for the tenant whereby the tenant is guaranteed to have an average RT of 3 ms for each LUN storing the tenant's data. The tenant may also be referred to as a consumer of the data storage system having its data stored on the data storage system. A single tenant or consumer may be, for example, one or more applications executing on a host. A single host may have one or more tenants or consumers where each of the tenants or consumers includes one or more applications. For simplicity of illustration, following examples may refer to a single application on a host as a tenant or consumer for which an SLO is specified where the SLO may be applied to each LUN used by the application. However, it will be appreciated by those skilled in the art that an SLO, such as RT, specified for a single tenant or consumer may be applied in the aggregate with respect to multiple applications and associated LUNs of the single tenant or consumer.

It should be noted that the SLO may specify a RT denoting a guaranteed level of performance with respect to a metric other than average RT per LUN. For example, the SLO may specify multiple RTs for an application's LUNs. The application may be a database application and the SLO may specify a first RT to be guaranteed for each of the LUNs used as one of the application's log devices and a second RT to be guaranteed for each of the LUNs used as one of the application's data devices.

An SLO, such as the RT SLO described herein, may be applied on a per LUN level (e.g., guaranteed for each LUN individually). An embodiment may also specify an I/O related SLO such as RT which may be guaranteed at a different level of granularity than per LUN. For example, the RT SLO may be guaranteed as an aggregate average RT for the tenant or consumer and thus as an average RT determined with respect to I/Os issued to all LUNs of the tenant or consumer. As another variation where a tenant includes multiple applications, the RT SLO may be guaranteed at the application level (e.g., the RT SLO is guaranteed for each individual application of the tenant across all LUNs used by each individual application).

In connection with description in following paragraphs, processing may include determining whether an SLO is being met. If the SLO is not being met whereby the average measured RT exceeds the SLO specified RT, such an occurrence may also be referred to herein as an SLO violation.

An embodiment may define an SLO violation as described above where the measured performance is worse than as specified by the SLO metric. It should be noted that an embodiment may also more generally define an SLO violation as obtaining a measured value for a performance metric, such as RT, where the measured value deviates more than a threshold amount from a specified SLO value for the performance metric. For example, the SLO may specify an average RT of 3 ms. An SLO violation may be determined if the measured average RT deviates more than 0.5 ms from the 3 ms. Thus, an SLO violation may be determined if the average measured RT is outside of the RT range 3 ms+/−0.5 ms. or outside the inclusive range of 2.5 ms through 3.5 ms. An embodiment may specify the deviation threshold amount, such as 0.5 ms, as a percentage of the specified SLO metric value 3 ms., or as a numeric quantity (e.g., real number).

Described in following paragraphs are techniques that may be used in connection with troubleshooting and avoidance of SLO breaches, such as related to poor or abnormal RT performance, caused by hidden workload characteristics. For example, two applications may each have a workload with same average I/O rate such as, for example 100 I/Os per second (IOPS). However, despite the two applications having the same average I/O rate, one application may experience worse performance than another due to the two application workloads being characterized by different interarrival (IA) time distributions. Thus, in one aspect, the varying IA time distributions of the application workloads may be characterized as a hidden workload characteristic where the IA time distribution impacts RT performance of the application having the workload as well as other applications that may share resources with the application. This is described in more detail below.

IA time with respect to I/Os may be defined as the amount of time between two consecutive I/Os received at the data storage system. Thus, the distribution of the IA time is the distribution of multiple individual IA times between different pairs of consecutive I/Os received at the data storage system. The IA time distribution may be used to characterize I/Os received at the data storage system which are sent by an application and directed to one or more LUNs used by the application.

Continuing with the above-mentioned example, consider the average I/O rate such as 100 I/Os per second (IOPS). With an average I/O rate of 100 IOPs, consider a first I/O stream or workload where an I/O may arrive at the data storage system one every 10 milliseconds (ms). The first I/O stream or workload may have a uniform IA time distribution where time gap or IA time between each pair of consecutive I/Os is the same, or approximately the same (within some specified threshold amount of time). As an alternative with the same average I/O rate of 100 IOPS, consider a second I/O stream or workload where the 100 I/Os per second may be generated in a burst whereby they are all generated at the start of every time period that is a single second and then no further I/O are generated for the remainder of each of the one second time periods. (e.g., all 100 I/Os arrive at the same time with the arrival of each new second time period with no additional I/Os received during the remainder of the one second time periods). With this second I/O stream, the IA time may be characterized as bursty. Thus, the foregoing illustrates where two I/O streams, such as from two different applications, may each have the same metric value of 100 IOPS but where each I/O stream may have a very different IA time distribution with respect to the I/Os. It has been determined that having an IA time distribution that is bursty as with the second I/O stream results in worse performance, such as measured in terms of average RT, than the first I/O stream. More generally, although two applications may perform the same number of IOPS, having a second application with the second workload and undesirable bursty IA time distribution with respect to I/Os may adversely impact the performance of the second application as well as adversely impact performance of other application(s), such as a first application having the first workload that has a uniform IA time distribution.

What will now be described are different IA time distributions that may characterize the IA time associated with a workload. The following provides additional detail regarding the uniform and bursty IA time distributions briefly mentioned above and also describes other exemplary IA time distributions.

A first type of IA time distribution may be referred to as synchronous (synch). Pending I/Os that have been received at the data storage system and are waiting to be serviced (e.g., outstanding I/Os) may be placed in a queue. For a workload or I/O stream characterized as having the synch IA time distribution, the I/Os may be generated such that there is at most N pending I/Os in the queue, N being an integer value greater than zero (0). Thus, N may be a maximum size of the queue (e.g., maximum queue depth or length). Additionally, the I/Os may be generated at a rate which maintains N as an average or fixed queue length. In this manner, once the queue has reached the specified size N, a new I/O may be issued only after a pending I/O has completed whereby the queue maintains N as the fixed length or size of pending I/Os. (e.g., Once the queue has the maximum number of I/Os, a next consecutive I/O, I/On+1, is thus generated and received only after a previously received pending I/O has completed (has been serviced). It should be noted that SYNCH IA time distribution may be characterized by any suitable queue length N. For example, the queue length N may be 1 or 2. Also, it should be noted that the uniform IA time distribution results in the best RT performance with respect to all other IA time distributions described herein.

A second type of IA time distribution may be referred to as uniform and is mentioned above. With a uniform IA time distribution with respect to a workload or I/O stream, the time gap or IA time between each pair of consecutive I/Os is the same, or approximately the same (within some specified threshold amount of time). With a uniform IA time distribution, the I/Os may also be characterized as generated at a constant rate. Note that with uniform distribution, a first I/O may be received and may be serviced when a second I/O is received. Thus, the second I/O may wait to be serviced, such as in a queue of pending I/Os awaiting service, In other words, the service time of such two I/Os may overlap.

A third type of IA time distribution may be referred to as random. With a random IA time distribution, the time at which a next I/O is generated is random such that the IA time between two consecutive I/Os is random or randomly distributed. For example, if the IA time is generally a time between a lower IA time bound and an upper IA time bound, the IA time between each two consecutive I/Os may be characterized as randomly distributed between the lower IA time bound and the upper IA time bound.

A fourth type of IA time distribution may be referred to as bursty and is mentioned above. With a bursty IA time distribution, there are spikes or bursts of I/O generated at different single points in time. For example, as noted above, many I/Os may be generated at a single point in time in a time period followed by not receiving any further I/Os during the time period. Note that in one embodiment, such as when simulating an I/O stream characterized as bursty, the different points in time at which bursts of multiple I/Os are generated may have an IA time between consecutive bursts that is randomly selected. (e.g., The same number of multiple I/O requests (comprising a single I/O burst) may be generated at consecutive points in time where the IA time between two points in time when the multiple burst are generated may be random).

The measured or observed average RT for a workload may vary depending on the IA time distribution associated with the workload. Generally, through experimentation and simulation, it has been determined that the foregoing 4 types of IA time distributions may be ranked from best to worst measured average RT achieved as follows: synch (best measured average RT), uniform, random and then bursty (worst measured average RT).

Figure 3:
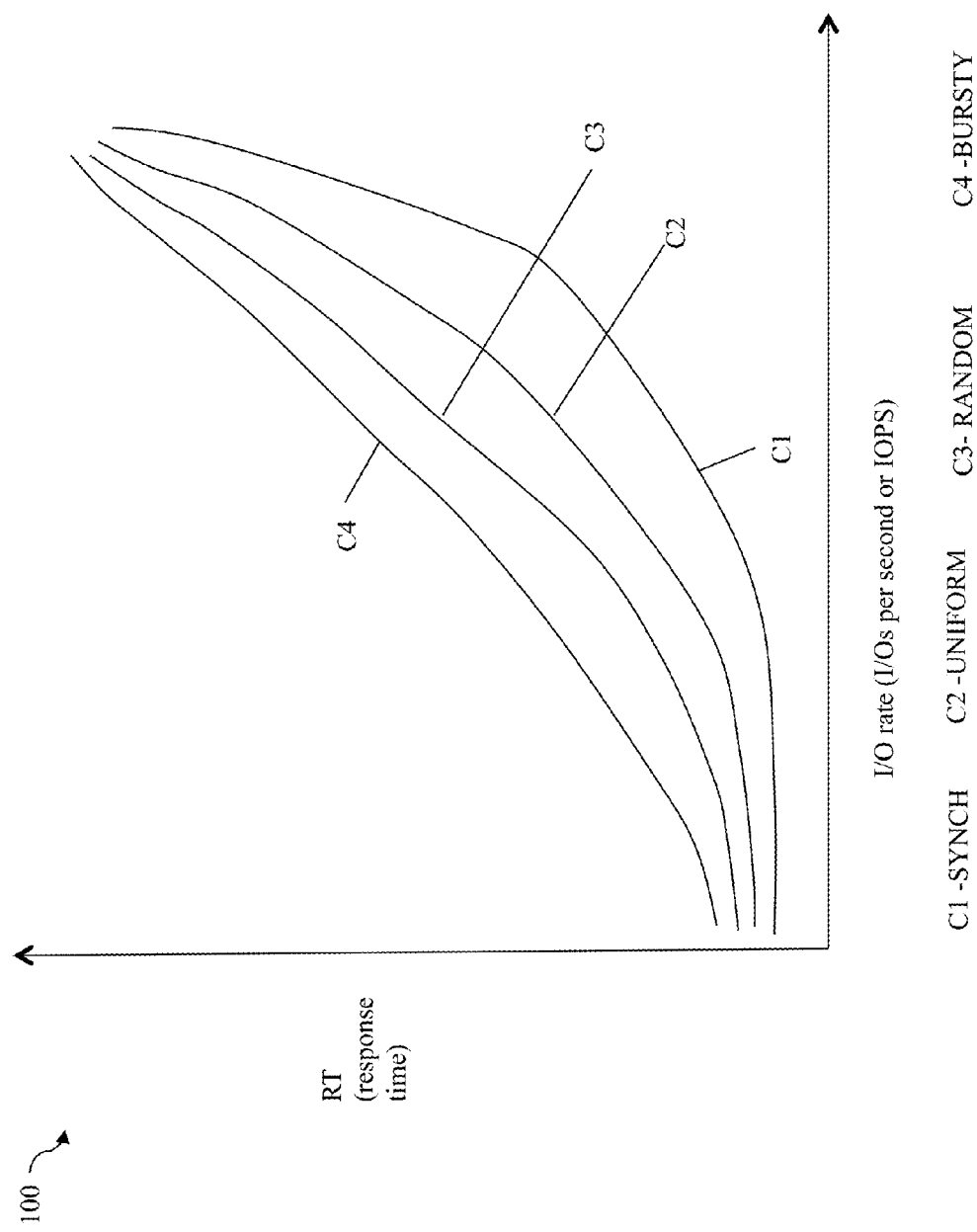
FIGS. 3 and 4 illustrate response time performance curves for workloads characterized by different interarrival time distributions.

Referring to FIG. 3, shown is an example illustrating the general RT performance curves for each of the 4 IA time distributions noted above. The example 100 illustrates the general shape of such curves and includes curve C1 for the synch IA time distribution, curve C2 for the uniform IA time distribution, curve C3 for the random IA time distribution, and curve C4 for the bursty IA time distribution. The curves of FIG. 3 show general shapes of RT performance for different IA time distributions. The general shape of the curves may obtained, such as through simulation, where the I/Os of a single workload characterized by one of the IA time distribution types are serviced in isolation without other competing workloads or I/O streams that would require sharing resources.

Figure 4:
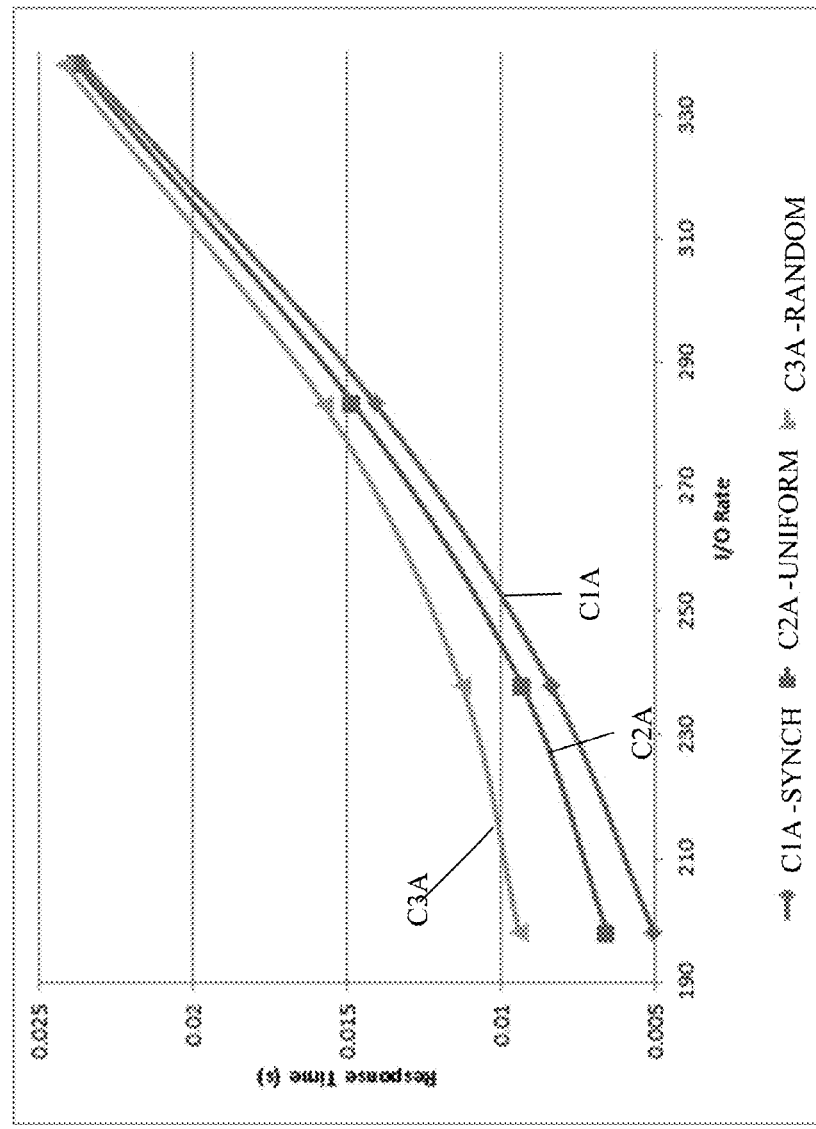

Referring to FIG. 4, shown is another example illustrating the general RT performance curves for each of 3 IA time distributions noted above. The example 200 illustrates the general shape of such curves and includes curve CIA for the synch IA time distribution, curve C2A for the uniform IA time distribution, and curve C3A for the random IA time distribution. The curves of FIG. 4 show general shapes of RT performance for different IA time distributions. As with FIG. 3, the general shape of the curves may obtained, such as through simulation, where the I/Os of a single workload characterized by one of the IA time distribution types are serviced in isolation without other competing workloads or I/O streams that would require sharing resources. FIG. 4 graphically illustrates the impact of different IA time distributions on disk RT where the RT values were measured on a 15K RPM FC (Fibre channel) rotating disk drive.

Thus, FIGS. 3 and 4 illustrate graphically the RT performance curves for the different IA time distributions with respect to a single I/O stream or workload. However, now consider the impact on measured RT performance that a first workload or I/O stream has on a second workload or I/O stream where resources are shared among the two workloads. For example, what is the impact in terms of measured RTs if there are two different workloads of two applications on the same data storage system where the two workloads (thus applications) share the same set of one or more resources, such as one or more physical storage devices. For example, the first application may issue I/Os to a first LUN configured to have its data stored on a first set of one or more PDs and the second application may issue I/Os to a second LUN configured to have its data stored on a second set of one or more PDs. The first and second sets of PDs may have at least one PD in common whereby the applications share one or more PDs.

Generally, one or more data storage system resources may be shared among two or more applications, and associated workloads. The one or more shared resources may include, for example, one or more PDs, one or more processors, one or more DAs, and the like.

To further illustrate, consider the following example where Application 1 (APP1) has a uniform workload of 100 IOPS and application 2 (APP2) has a bursty workload of 100 IOPS. If each application's workload is considered separately (e.g., each application issues I/Os to LUNs where (physical devices) PDs are not shared between the two workloads and applications) without an impact on the other, the following may be the approximate average RTs

| IA Time Distribution | Application | Average measured RT |
|---|---|---|
| 100% uniform | APP1 | 8 ms RT |
| 100% bursty | APP2 | about 400 ms RT |

A time period may be a second. With 100% bursty IA time distribution characterizing the I/O workload of App1, all 100% of the workload, or 100 I/Os, are received at the same time at the beginning of each time period, or second, and no further I/Os are received during that time period. Similarly, with 100% uniform IA time distribution characterizing the I/O workload of App2, the IA time distribution for all 100% of the workload or 100 IOPS has a uniform IA time distribution. Now consider the performance or RT impact of the workloads on one another where two PDs are shared among the two applications each with the foregoing workloads. For simplicity, assume that each application's workload is evenly partitioned among the two shared PDs so that each application has 50% of its workload (e.g., 50 IOPS) directed to each PD. Thus, each of the two shared PDs has a workload of 100 IOPS. In the foregoing example each of the two shared PDs has a workload of 50% uniform and 50% bursty (e.g. 50 IOPS have a uniform IA time distribution and 50 IOPS have a bursty IA time distribution). Based on the above, each PD may have approximate ave RT of about 200 ms. The foregoing illustrates the severity of the overall adverse performance impact the single undesirable bursty workload may have on both applications. Additionally, the foregoing illustrates that the bursty workload is the undesirable or problematic workload causing the overall average measured RT of 200 ms which may be identified as the workload or application having the worst RT.

Thus, through experimentation, it has been determined that although overall RT performance of multiple applications sharing the same PDs or other resources may be adversely impacted (e.g. such as the 200 ms average RT noted above for both applications), the one or more problematic workloads causing the RT performance problem will have the worst RT performance of all such application workloads sharing the same PDs or other resources. This is further illustrated through other simulation results that will now be described.

TABLE 1

Response Times (RTs) for two applications that use the same resource (Simulated). RTs are in milliseconds (ms).

| Utilization | IA Time Dist. App1 | IA Time Dist. App2 | RT-App 1 | RT-App2 |
|---|---|---|---|---|
| 0.9 | Synch | Synch | 18 | 18 |
| 0.9 | Uniform | Uniform | 27 | 27 |
| 0.9 | Random | Random | 56 | 56 |
| 0.9 | Uniform | Random | 37 | 41 |
| 0.9 | Uniform | Bursty | 290 | 442 |
| 0.8 | Uniform | Bursty | 79 | 112 |

The above Table 1 includes a first column of utilization (denoting shared resource utilization), a second column of the IA time distribution type for application 1(app1), a third column of the IA time distribution type for application 2(app2), a fourth column of the average measured RT for app1 and a fifth column of the average measured RT for app2. Each row of the table identifies the resulting RT performance for each application having the particular IA time distribution types noted in the row. Thus, Table 1 demonstrates the RT performance impact that IA time distribution of one application may have on another application's performance. Table 1 information also demonstrates that it is possible to identify the application and associated workload having the problematic IA time distribution as the one having the worst performance or highest measured RT. As described herein, it has been determined that a problematic IA time distribution may be the bursty distribution. In all cases in Table 1, the two applications App1 and App2 performed the same I/O rate or IOPS. The average service time was 9 seconds distributed uniformly ranging from 4.5 to 13.5, inclusively. The IOPS may be for read miss I/Os issued. The bursty workload was generated using a random distribution where the IA time between each set of five (5) simultaneously generated I/Os was random. Thus, 5 I/Os were generated at single points in time where the IA time between each such point in time was random. With the synch distribution, a queue length of 2 was used.

The above simulation results illustrate that the one or more problematic workloads causing the RT performance problem will have the worst RT performance of all such application workloads sharing the same PDs or other resources. It should be noted that in practice, the particular IA time distribution of a workload may not be known. Furthermore, it is also not necessary to characterize or determine the IA time distribution of a workload to use techniques herein. Generally, even without knowing which workload in Table 1 simulation scenarios has a bursty IA time distribution, such a workload may be clearly identified as the problematic workload by having the worst measured RT of both applications. For example, with reference to table 1 above, there may be no performance problems associated with the simulation scenarios of the first 4 lines of table 1. However, the last two lines of table 1 may be identified as having unacceptably high RTs. For each of these simulation scenarios, the problematic application workload may be identified as the application workload having the worst measured average RT (e.g., App2 in both cases/last two lines of table 1 where App2 has a bursty workload and associated measured RTs of 442 ms. and 112 ms).

In a system where multiple applications having associated application I/O workloads share resources, an embodiment in accordance with techniques herein may identify a problematic workload as the one having the worst measured RT of the multiple applications. More generally, as described in more detail below, a set of one or more problematic workloads may be identified based on measured RTs where each such problematic workload has a measured RT that is worse than any other RT associated with a workload not in the set. Thus, using techniques described herein provides for identification of problematic workloads, and applications and LUNs associated with such problematic workloads, so that a remediation action may be taken to correct or alleviate conditions causing the detected performance problem or potential performance problem. Examples of remediation actions are described elsewhere herein.

An embodiment in accordance with techniques herein may perform a first step that monitors RT performance at one or more levels such as, for example, of the overall data storage system, among multiple workloads or I/O streams associated with a set of LUNs sharing PDs or other resources, of LUNs sharing one or more PDs or other resources, of one or more PDs shared among multiple LUNs and associated workloads, and the like. As part of the monitoring of the first step, processing may include determining when the measured RT indicates an occurrence of abnormal performance such as, for example, indicates an existing current performance problem or otherwise indicates when there is a risk of developing a performance problem. For example, as a first step, an embodiment may monitor the average overall RT such as for all applications sharing a set of one or more resources. The overall average RT may be monitored to determine when it exceeds an acceptable average RT or acceptable RT range whereby when the overall average RT exceeds the acceptable average RT, it may be determined that there is an existing performance problem or there is a risk of developing a performance problem. Thus, generally abnormal performance may be detected or determined and may indicate an actual performance problem or that the system is at risk of developing a performance problem even though one has not yet occurred. Generally, as described in more detail elsewhere herein, determining whether there is an occurrence of abnormal performance may be performed in accordance with a first set of one or more criteria. For example, the first set of one or more criteria may include any of determining whether there is a current SLO violation and determining whether there is a risk of an SLO violation. As described in more detail below, if there is a risk of an SLO violation, an SLO violation has not yet occurred. However, current conditions, such as the current measured RT for a given workload, may indicate that there is risk of an SLO violation, for example, if the workload should increase.

Once the occurrence of the abnormal performance (e.g., SLO violation or at risk for an SLO violation) has been determined, processing may then be performed in a second step to identify one or more problematic workloads such as with respect to workloads sharing a set of one or more resources. As described herein in more detail, a first set of one or more problematic workloads may be identified as those from a second set of one or more multiple workloads sharing resources based on a measured RT associated with each workload in the second set. As described elsewhere herein, the workload(s) of the first set are those having associated RTs that are the worst of all workloads in the second set.

What will now be described is one way in which processing may determine that there is a risk of developing a performance problem, such as an SLO violation, even though one has not yet occurred.

An embodiment in accordance with techniques herein may have an expected or modeled RT performance curve for a PD. For example, an embodiment may have a modeled RT performance curve for each type of PD such as one for SATA rotating disk PDs, a second for FC 10K rotating disk PDs, a third for FC 15K rotating disk PDs and a fourth for EFDs (enterprise flash drives). Such curves may be used to model expected RTs for different workloads.

Figure 5A:
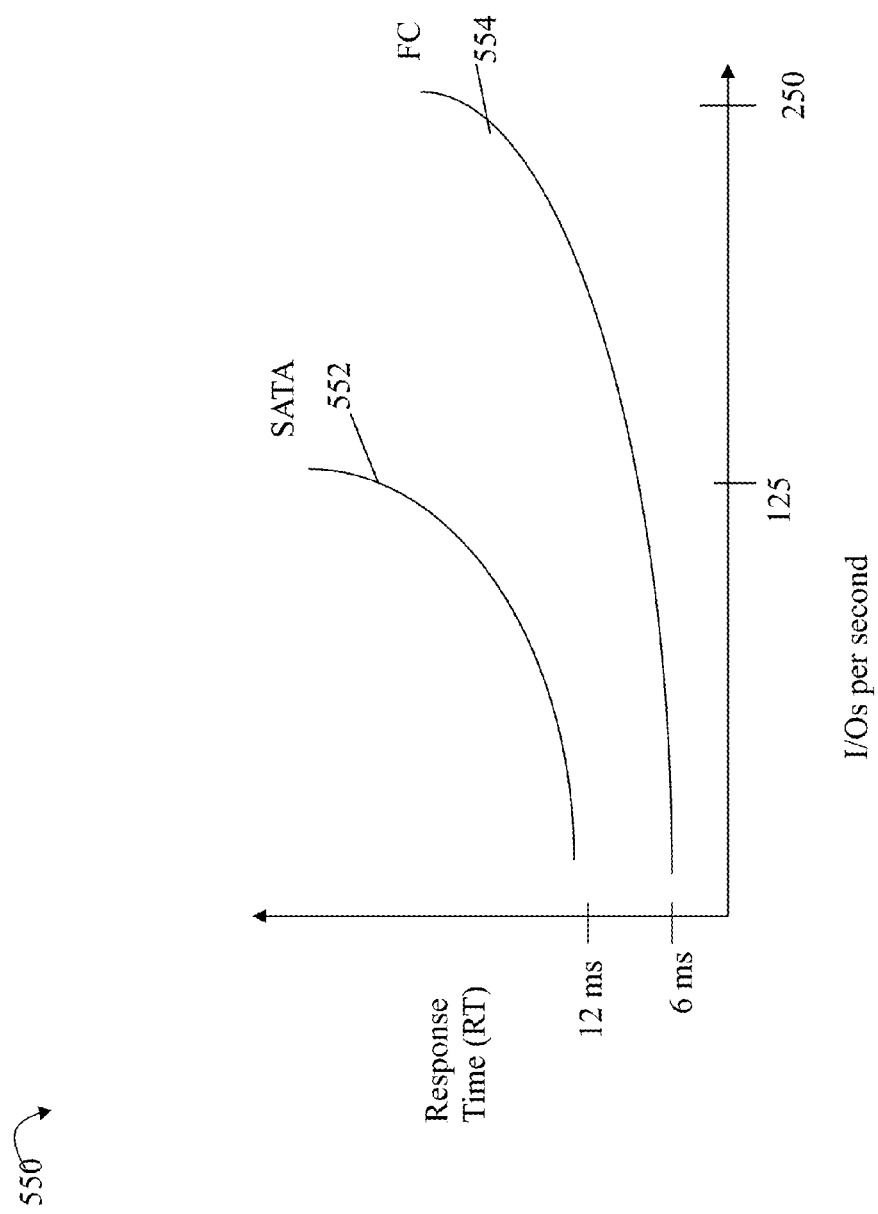
FIGS. 5A and 5B are examples of modeled RT performance curves such as for different types of physical storage devices that may be used in an embodiment in accordance with techniques herein.

Referring to FIG. 5A, shown is an example of performance characteristic information illustrated in the form of curves for different storage device of drive types. The example 550 illustrates general curve shapes as may be associated with a SATA rotating drive (as represented by 552) and an FC rotating disk drive (as represented by 554) in connection with processing rate (X-axis in terms of IOs/second) vs. response time (Y-axis). As may be seen from the illustration 550, for a same processing rate of I/Os/second, different RTs are obtained for each of a SATA drive and an FC disk drive. An embodiment may store data as represented by the curves of FIG. 13 in one or more tables having rows and columns of data point values (e.g., X and Y coordinates for a plurality of points). When stored in tabular form, interpolation, curve fitting techniques, and the like, may be used in connection with determining values of X and Y coordinates lying between two existing points stored in the table.

An embodiment may use appropriate performance curves for each of the different types of PD that may be used in an embodiment. The performance curves may be obtained based on observed or collected data through experimentation.

Figure 5B:
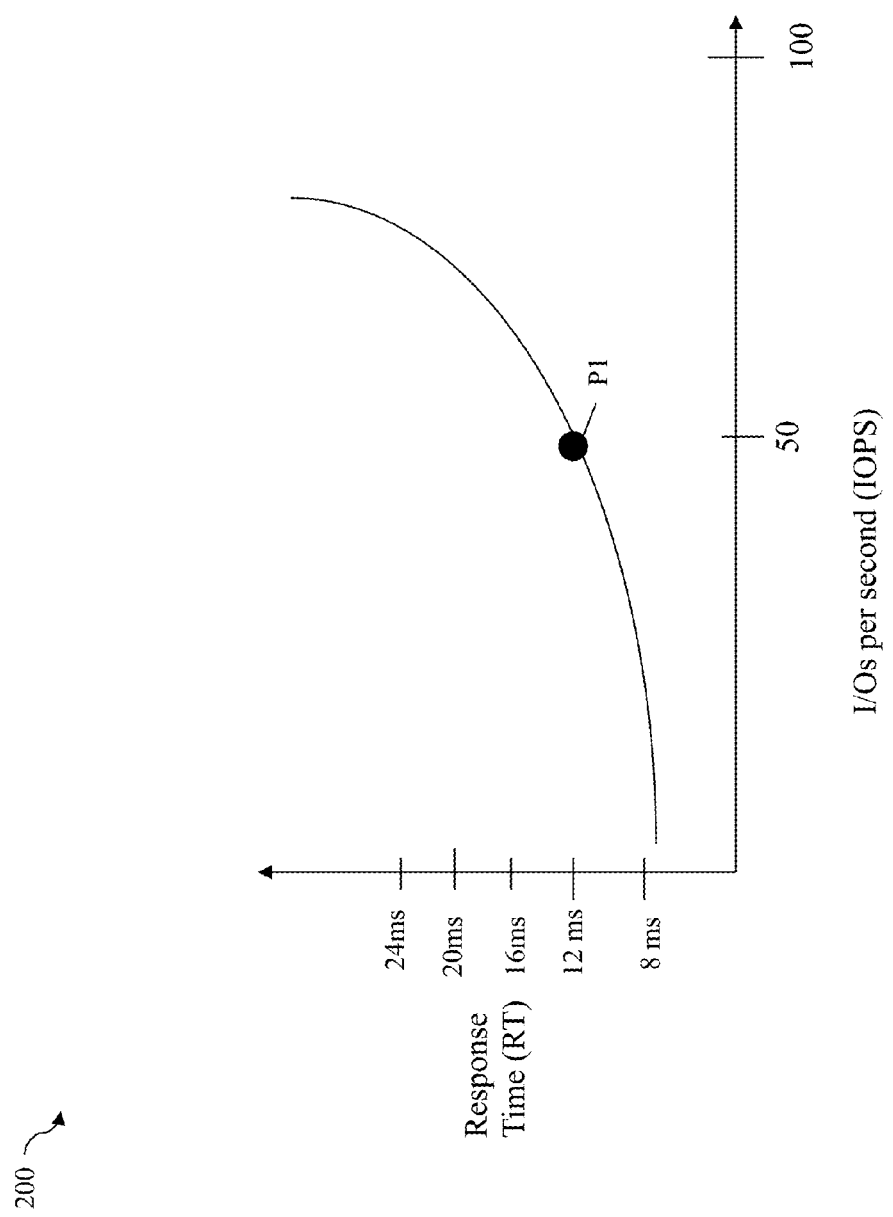

As described in more detail below, RT performance curves, such as in FIG. 5A, may be used in detecting abnormal RT performance such as when there is a risk of an SLO violation and an SLO violation has not yet occurred. In this case, assume there is a single PD shared among multiple workloads. The single PD may have an associated modeled performance curve as illustrated in FIG. 5B. The example 200 of FIG. 5B illustrates a performance curve with RT on the Y axis and IOPS on the X axis as described above for FIG. 5A. The current workload for the shared PD may be 50 IOPs and the modeled RT performance curve of FIG. 5B shows that about a 12 ms RT for the PD is expected as illustrated by point P1. The SLO may specify an acceptable RT range of 25-27 ms for the one or more LUNs and one or more applications each having its data stored on the PD. For the current workload of 50 IOPS, the measured or observed average RT (RTactual) for the PD, and thus the LUN(s) and application(s) having data stored on the PD may be, for example 25 ms. Although the RTactual may be within the SLO, the RTactual (e.g., 25 ms) may exceed another threshold where the threshold is, for example, twice the average expected RT of 12 ms (e.g., threshold RT of 24 ms). Thus, even though the RTactual is within the required performance SLO, the foregoing threshold is exceeded and it may be determined to perform additional processing to preemptively avoid an SLO violation. Based on the foregoing when the threshold is exceeded, it may be determined that the system is "at risk" of an SLO violation occurring should the current workload increase (e.g., when the workload increases in current conditions, the RTactual will both exceed the acceptable RT range of the SLO and may also scale multiple times beyond the expected).

Thus, the foregoing is an example of a scenario where there is not yet an SLO violation but use of the modeled RT performance curve may determine that there is a risk for an SLO violation (potential SLO violation) due to the foregoing threshold being exceeded. In response, processing may be performed to identify the problematic workload(s) and accordingly take an appropriate preventive action to avoid a future SLO violation.

In connection with the foregoing example, RT actual (measured or observed) for a PD may be within the acceptable RT range (such as of an SLO for a LUN, application, etc.) but, for current workload in IOPS, RTactual for the PD may much higher than expected. For example RTactual may be some threshold amount or percentage more than the average RT expected based on the modeled RT performance curve. For example, an embodiment may specify a threshold, such as 1.5 (150%) or 2.0 (200%) times the average RT expected whereby processing may be performed/triggered if RTactual exceeds the foregoing threshold based on the expected average RT obtained from the performance curve.

Continuing with the above example, an embodiment in accordance with techniques herein may determine that there is a risk of an SLO violation such as when RTactual of 25 ms. exceeds the above-noted RT threshold of 24 ms. In response, further processing may be performed to identify the one or more problematic workloads. Consistent with description elsewhere herein, for multiple applications sharing a set of one or more resources, such as the PD noted above, in accordance with techniques herein, a first of the multiple applications having the problematic workload may be identified as the one having the worst performance (e.g., greatest adverse impact) of all the multiple application workloads.

Thus, based on the RT "fingerprint" associated with each of the application workloads, a particular problematic application workload may be identified as the one that is the worst in terms of RT performance (with respect to all application workloads sharing the same set of one or more resources). Generally, if an SLO violation has occurred or if RTactual for the PD significantly exceeds an expected RT (e.g., such as based on threshold noted above) where there is a risk of an SLO violation, a problematic application workload may be identified as the one that is the worst in terms of RT performance (with respect to all application workloads sharing the same set of one or more resources, such as PDs). For example, a first application may have a first workload that is BURSTY. One or more other applications sharing the same one or more PDs as the first application may each have an application workload that is UNIFORM. In accordance with techniques herein, it may be determined that the foregoing first application workload of BURSTY may be identified as the problematic workload based on comparison of the RTactuals observed for each of the application workloads. For example, the RTactual for the first application workload may be significantly worse or higher than all other RTactuals. Thus, through experimentation, it has been determined that although overall RT performance of multiple applications sharing the same PDs or other resources may be adversely impacted, the one or more problematic workloads causing the RT performance problem will have the worst RT performance.

Generally, the foregoing describes a technique that includes determining whether there is abnormal performance in a data storage system in accordance with a first set of one or more criteria. In one embodiment, the first set of one or more criteria may indicate there is abnormal performance if any one or more of the following are detected: an actual SLO violation and a potential SLO violation. As described herein, an SLO violation with respect to RT may occur if an observed average RT, RT actual, exceeds an RT specified SLO value. A potential SLO violation may occur, for example, if the RT actual does not exceed the SLO specified RT limit but does exceed a modeled or expected RT value for the current workload.

It should also be generally noted that the foregoing detection or determination of abnormal performance may be made with respect to multiple applications and associated workloads that share a set of one or more resources, such as a PD. Responsive to detecting the abnormal performance such as with respect to the multiple applications, additional processing may be performed to identify which one or more of the workloads of the multiple applications are problematic based on measured RTs associated with the workloads. Such identification of the one or more problematic workloads may be performed in accordance with a second set of one or more criteria. In one embodiment, the second set of one or more criteria may include one or more rules used to identify one or more problematic workloads based on measured RTs associated with the workloads.

In one embodiment, the second set of one or more criteria may include a first rule or heuristic that determines that a first application of the multiple applications has a problematic first workload where the first application has an associated first RT for the first workload and the first RT is larger than any other RT associated with any of the other multiple application workloads. For example, APP1 may have a measured RT1 for its associated I/O workload W1 and APP2 may have a measured RT2 for its associated I/O workload W2. An embodiment in accordance with techniques herein may determine which of the measured RTs, RT1 and RT2, is the largest or maximum RT value. The application and workload associated with the maximum measured RT value may be determined as the workload causing the abnormal performance detected.

The second set of one or more criteria may include a second rule or heuristic used with multiple applications to determine which one or more applications each have an associated problematic workload. Use of the second rule may result in determining that more than one application has an associated problematic workload causing the abnormal performance (actual or potential performance problem such as, for example, an actual or potential SLO violation).

In connection with this second rule, after the abnormal performance has been identified (e.g. after identifying that there exists an actual performance problem or a potential performance problem), the RTs of the various applications may be compared based on the second rule described in more detail below. Assume there are N applications (N>1) sharing a set of one or more resources, such as PDs. Each of the N applications may have an associated workload N and an associated measured RTn for the workload N. The N RTs measured for the N workloads may be sorted or ranked in increasing order. Let's assume we have an RT ranking as follows:

$RT1 > RT2 > RT3 > \ldots > RTn$

Based on the foregoing, a second rule or heuristic may be applied to determine which of the N applications and associated N workloads are problematic.

If the difference between RT1 (the worst response time) and RTn (the best response time) is less than 20% of RTn (the best RT), then all the applications are determined as problematic.

Otherwise, all the applications whose measured RT exceeds RTn by 20% of RTn are determined as problematic. The foregoing may be expressed as:

if $(RT1-RTn) < (20\% * RTn)$ then determine that all N applications have problematic workloads.

else determine which of the applications has an associated measured $RT > RTn + (20\% * RTn)$.

As a variation to the foregoing in the second rule, rather than use (20%*RTn), 20%*RT1 (the worst RT) may be used. In this case, the second rule variation may be expressed as:

if $(RT1-RTn) < (20\% * RT1)$ then determine that all N applications have problematic workloads.

else determine which of the applications has an associated measured $RT > RTn + (20\% * RT1)$.

It should be noted that the second set of one or more criteria used in an embodiment may generally include any one or more of the foregoing rules, as well as any other suitable rules or criteria.

After one or more problematic workloads are identified, such as in accordance with the second set of one or more criteria, processing may be performed to take a remediation action whereby the goal of taking the remediation action is to alleviate or eliminate the abnormal performance. For example, the remediation action may be taken to alleviate or remove conditions contributing to the SLO violation or the risk thereof causing the abnormal performance.

Possible remediation actions may include any one or more of the following. A first action may be taken to notify the customer or user (e.g., administrator or manager) of the data storage system regarding the problematic application workload. The customer may be notified regarding the one or more LUNs to which the particular problematic I/O workload is directed. As another action, the problematic I/O workload, and thus the problem set of one or more LUNs to which the workload is directed, may be given their own set of dedicated data storage system resources (e.g., PDs. FA ports, CPUs) to use thereby isolating the problematic workload. For example, the problem LUNs may be relocated to one or more PDs not shared with any other LUNs associated with any other application workload. As yet another action, the problematic workload and associated set of one or more LUNs may be relocated to another physical data storage system. As yet another action, processing may be performed to pace down (e.g. slow down or throttle down) the I/Os of problematic workload. For example, the rate at which the host or application sends the I/Os to the data storage system may be reduced or forwarded in a more uniform manner to reduce a number of I/O operations sent in a single burst/point in time (e.g., 10 I/Os every $\frac{1}{10}^{th}$ of a second rather than 100 I/Os at the same point in time within each second time period).

It should be noted that RTs, such as the measured RTs, used in connection with techniques herein may be normalized or adjusted for possible variations in I/O sizes. Generally, one component contributing to an observed or measured RT is data transfer time. The data transfer time is the amount of time it takes to transfer the data to or from the physical storage device (e.g., to the physical storage device for a write operation and from the physical storage device for a read operation). The RT used in connection with techniques herein may be calculated by subtracting the amount of time it takes to transfer the data from the RT measured or observed. Furthermore, the data transfer time is a linear function of the I/O size. For example, if one application is issuing I/Os that are 128 KB and a second application is issuing I/Os that are 8 KB, then there may be a difference of 1.2 ms (if the transfer rate is 100 MB/sec) in RT due the difference in I/O sizes independent of (e.g., regardless of) the distribution.

What will now be described are flowcharts summarizing processing described above that may be performed in an embodiment in accordance with techniques herein.

Figure 6:
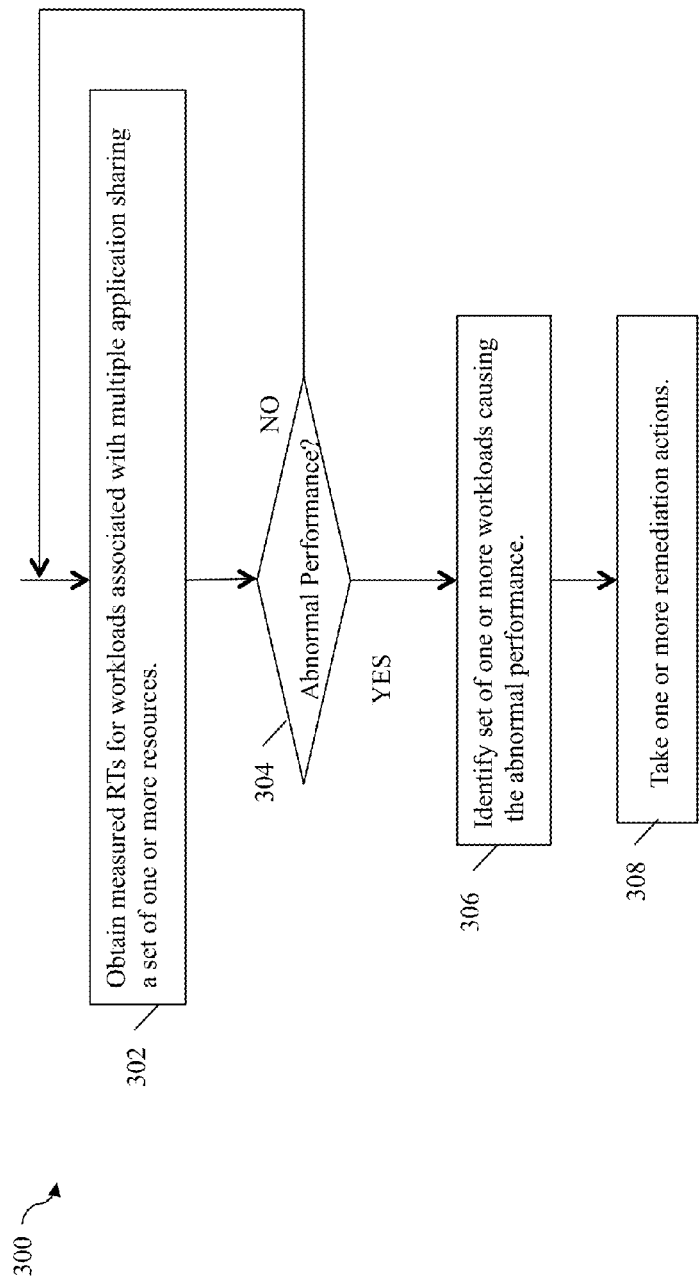
FIGS. 6, 7, and 8 are flowcharts of processing steps that may be performed in an embodiment in accordance with techniques herein.

Referring to FIG. 6, shown is a first flowchart 300 of processing steps that may be performed in an embodiment in accordance with techniques herein. At step 302, measured RTs are obtained for workloads associated with multiple applications sharing a set of one or more resources of the data storage system. At step 304, a determination is made as to whether there is an occurrence of abnormal performance based on the measured RTs. As described herein, step 304 may be performance in accordance with a first set of one or more criteria such as determining whether there is an SLO violation or whether there is a risk of an SLO violation. If step 304 evaluates to no, control proceeds back to step 302. It should be noted that step 302 may be performed periodically in an ongoing basis to monitor performance in the data storage system. Thus, processing of step 302 may be repeated upon the occurrence of the next time period. If step 304 evaluates to yes, control proceeds to step 306 to identify a set of one or more workloads that are problematic. As described herein, step 306 may be performed in accordance with a second set of one or more criteria to identify one or more workloads associated with the multiple applications that are problematic and therefore determined as causing the abnormal performance detected in step 304. At step 308, one or more remediation actions may be taken for the problematic workload(s) identified in step 306.

Figure 7:
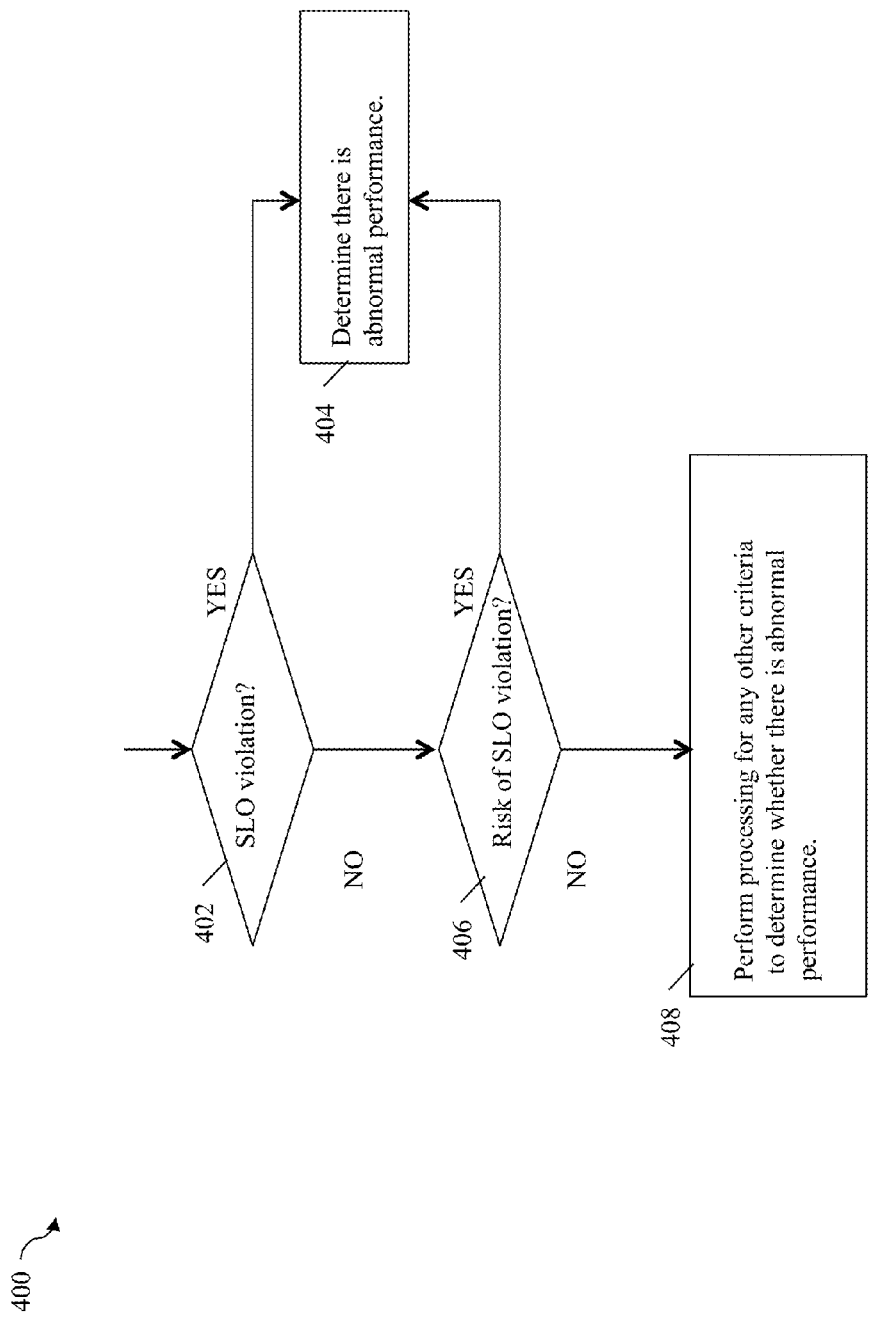

Referring to FIG. 7, shown is a second flowchart 400 of processing steps that may be performed in an embodiment in accordance with techniques herein. The flowchart 400 provides additional detail regarding step 304 that may be performed in one embodiment in accordance with techniques herein based on the first set of one or more criteria. In this example, the first set of one or more criteria may include determining whether there is an SLO violation, determining whether there is a risk of an SLO violation, and optionally one or more other items included in the first set of one or more criteria. At step 402, a determination is made as to whether there is an SLO violation. If step 402 evaluates to yes, control proceeds to step 404 where it is determined that there is abnormal performance. If step 402, evaluates to no, processing proceeds to step 406 to continue evaluating other items included in the first set of one or more criteria. In step 406, a determination is made as to whether there is a risk of an SLO violation. If step 406 evaluates to yes, control proceeds to step 404. If step 406 evaluates to no, control proceeds to step 408 to continue evaluating any remaining items included in the first set of one or more criteria.

Figure 8:
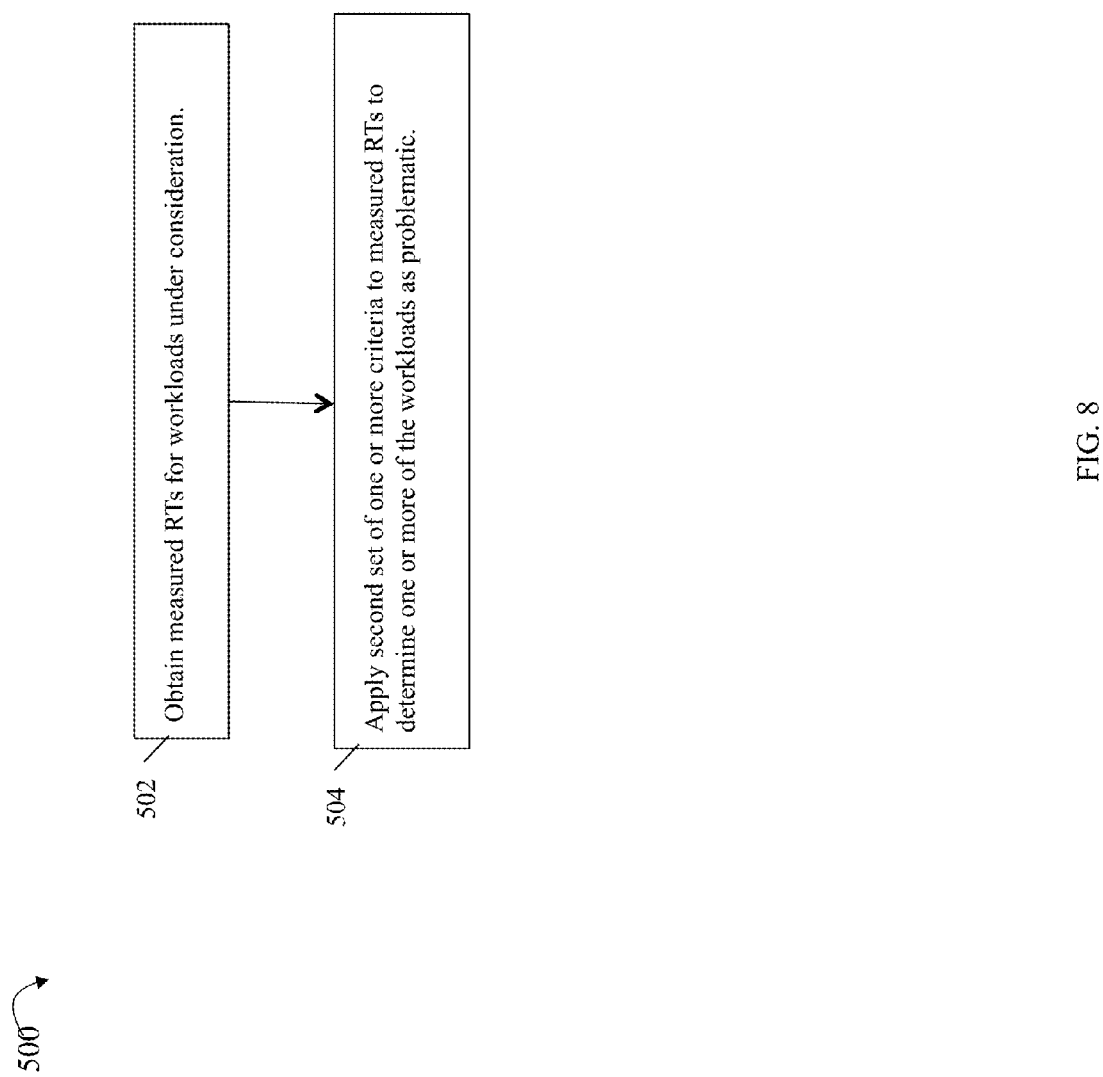

Referring to FIG. 8, shown is a third flowchart 500 of processing steps that may be performed in an embodiment in accordance with techniques herein. The flowchart 500 provides additional detail regarding step 306 that may be performed in one embodiment in accordance with techniques herein based on the second set one or more criteria. At step 502, the measured RTs for the workloads under consideration are obtained. Step 502 may use the same measured RTs as in step 302 of FIG. 6. At step 504, processing is performed to apply the second set of one or more criteria to the measured RTs to identify one or more of the workloads (associated with the measured RTs) as problematic. In this example, the second set of one or more criteria may include any of the first and second rules described above, alone or in combination with, any other suitable rules or items. For example, the second one or more criteria may include determining the largest or maximum measured RT from step 502 and identifying the largest or maximum measured RT as problematic (e.g., causing the detected abnormal performance).

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of identifying problematic workloads comprising:
    receiving a plurality of measured response times for a plurality of workloads associated with a plurality of applications, each of the plurality of applications having one of the plurality of workloads resulting in one of the plurality of measured response times for said each application, wherein the plurality of applications share a set of one or more resources;
    determining, in accordance with a first set of one or more criteria, whether there is an occurrence of abnormal performance with respect to performance of the plurality of applications; and
    responsive to determining the occurrence of abnormal performance with respect to performance of the plurality of applications, performing second processing, said second processing including:
        determining, using the plurality of measured response times and in accordance with a second set of one or more criteria, an application set of one or more of the plurality of applications each having an associated one of the plurality of workloads causing the occurrence of abnormal performance, wherein the second set of one or more criteria includes a rule that determines a first of the plurality of applications is included in the application set and contributes to the occurrence of abnormal performance if the first application has a first of the plurality of workloads resulting in a first of the plurality of measured response times and the first measured response time is a maximum of all of the plurality of measured response times, wherein the first workload for the first application included in the application set has a bursty interarrival time distribution.

2. The method of claim 1, wherein each of the plurality of workloads is an I/O workload with respect to an associated one of the plurality of applications issuing I/O operations of the I/O workload.

3. The method of claim 1, wherein the one or more resources include any of one or more physical storage devices, one or more disk adapters, and one or more processors.

4. The method of claim 1, wherein the first set of one or more criteria includes determining that there is an occurrence of abnormal performance if any one or more of a service level objective violation and a risk of a service level objective violation are detected.

5. The method of claim 4, wherein the service level objective violation for one of the plurality of applications and the risk of a service level objective violation for the one application are each determined with respect to a defined service level objective for the one application, wherein the defined service level objective specifies a defined response time and it is determined that the service level objective violation occurs when a measured response time for an associated workload of the one application exceeds the defined response time, and it is determined that the risk of the service level objective occurs for the one application when a measured response time for the associated workload of the one application exceeds a modeled expected response time for the associated workload of the one application.

6. The method of claim 5, wherein the modeled expected response time is obtained from a modeled performance curve.

7. The method of claim 1, wherein the second set of one or more criteria includes a second rule that determines whether a difference between the worst of the plurality of measured response times and the best of the plurality of response times is less than 20% of the best measured response time, and if so, then all of the plurality of applications are included in the application set.

8. The method of claim 7, wherein the second rule further indicates that, if the difference between the worst measured response time and the best response time is not less than 20% of the best measured response time, then any of the plurality of applications having an associated one of the plurality of measured response times larger than 120% of the best measured response time is included in the application set.

9. The method of claim 1, wherein the second set of one or more criteria includes a second rule that determines whether a difference between the worst of the plurality of measured response times and the best of the plurality of response times is less than 20% of the worst measured response time, and if so, then all of the plurality of applications are included in the application set.

10. The method of claim 9, wherein the second rule further indicates that, if the difference between the worst measured response time and the best response time is not less than 20% of the worst measured response time, then any of the plurality of applications having an associated one of the plurality of measured response times larger than 120% of worst measured response time is included in the application set.

11. The method of claim 1, wherein the second processing includes performing a first remediation action for the first application.

12. The method of claim 11, wherein the plurality of applications each issue I/O operations to one or more logical devices having physical storage provisioned on one or more physical devices of a first data storage system for which the occurrence of abnormal performance has been determined, the one or more physical devices being included in the set of one or more resources shared by the plurality of applications, and wherein the remediation action includes any of a first action notifying a user regarding the first application, the first workload, and one or more logical devices to which the first workload is directed as being problematic, a second action of providing a set of dedicated one or more resources of the first data storage system to the first application, a third action of relocating the one or more logical devices and the first workload of the first application to another data storage system different from the first data storage system and a fourth action of reducing a number of I/O operations sent in a single burst.

13. A data storage system comprising:
one or more processors;
one or more physical storage devices wherein storage is provisioned from the one or more physical storage devices for a first set of one or more logical devices;
a memory comprising code stored therein that, when executed by a processor, performs a method comprising:
receiving a plurality of measured response times for a plurality of workloads associated with a plurality of applications, each of the plurality of applications having one of the plurality of workloads resulting in one of the plurality of measured response times for said each application, wherein the plurality of applications share a set of one or more resources;
determining, in accordance with a first set of one or more criteria, whether there is an occurrence of abnormal performance with respect to performance of the plurality of applications; and
responsive to determining the occurrence of abnormal performance with respect to performance of the plurality of applications, performing second processing, said second processing including:
determining, using the plurality of measured response times and in accordance with a second set of one or more criteria, an application set of one or more of the plurality of applications each having an associated one of the plurality of workloads causing the occurrence of abnormal performance, wherein the second set of one or more criteria includes a rule that determines a first of the plurality of applications is included in the application set and contributes to the occurrence of abnormal performance if the first application has a first of the plurality of workloads resulting in a first of the plurality of measured response times and the first measured response time is a maximum of all of the plurality of measured response times, wherein said first application adversely impacts performance of at least a second of the plurality of applications sharing the set of resources with the first application, said second application having a second of the plurality of workloads and a second of the plurality of measured response times, wherein said first workload and said second workload are approximately the same and the second measured response time is less than the first measured response time.

14. A non-transitory computer readable medium comprising code stored thereon that, when executed, performs a method of identifying problematic workloads, the method comprising:
receiving a plurality of measured response times for a plurality of workloads associated with a plurality of applications, each of the plurality of applications having one of the plurality of workloads resulting in one of the plurality of measured response times for said each application, wherein the plurality of applications share a set of one or more resources;
determining, in accordance with a first set of one or more criteria, whether there is an occurrence of abnormal performance with respect to performance of the plurality of applications; and
responsive to determining the occurrence of abnormal performance with respect to performance of the plurality of applications, performing second processing, said second processing including:
determining, using the plurality of measured response times and in accordance with a second set of one or more criteria, an application set of one or more of the plurality of applications each having an associated one of the plurality of workloads causing the occurrence of abnormal performance, wherein the second set of one or more criteria includes a rule that determines a first of the plurality of applications is included in the application set and contributes to the occurrence of abnormal performance if the first application has a first of the plurality of workloads resulting in a first of the plurality of measured response times and the first measured response time is a maximum of all of the plurality of measured response times, wherein the first set of one or more criteria includes determining that there is an occurrence of abnormal performance if any one or more of a service level objective violation and a risk of a service level objective violation are detected.

15. The non-transitory computer readable medium of claim 14, wherein each of the plurality of workloads is an I/O workload with respect to an associated one of the plurality of applications issuing I/O operations of the I/O workload.

16. The non-transitory computer readable medium of claim 14, wherein the one or more resources include any of one or more physical storage devices, one or more disk adapters, and one or more processors.

17. The non-transitory computer readable medium of claim 14, wherein the service level objective violation for one of the plurality of applications and the risk of a service level objective violation for the one application are each determined with respect to a defined service level objective for the one application, wherein the defined service level objective specifies a defined response time and it is determined that the service level objective violation occurs when a measured response time for an associated workload of the one application exceeds the defined response time, and it is determined that the risk of the service level objective occurs for the one application when a measured response time for the associated workload of the one application exceeds a modeled expected response time for the associated workload of the one application.

18. The method of claim 1, wherein said first application adversely impacts performance of at least a second of the plurality of applications sharing the set of resources with the first application, said second application having a second of the plurality of workloads and a second of the plurality of measured response times, wherein said first workload and said second workload are approximately the same and the second measured response time is less than the first measured response time.

\* \* \* \* \*